United States Patent
Zarin et al.

(10) Patent No.: US 7,930,244 B2
(45) Date of Patent: *Apr. 19, 2011

(54) METHOD AND APPARATUS FOR PROVIDING PRE-EXISTING CUSTOMERS AND PROSPECTIVE CUSTOMERS WITH AN IMMEDIATELY ACCESSIBLE ACCOUNT

(75) Inventors: Marjorie Faith Zarin, New York, NY (US); Rachel Glim, New York, NY (US); Heather D. Kay, Hoboken, NJ (US); Timothy Patrick Lewis, Phoenix, AZ (US); Rhene Meyer, Phoenix, AZ (US); Dafna Sarnoff, New York, NY (US); Robert P. Cichon, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,067

(22) Filed: Jul. 6, 2010

(65) Prior Publication Data

US 2010/0274701 A1 Oct. 28, 2010

Related U.S. Application Data

(63) Continuation of application No. 10/082,171, filed on Feb. 25, 2002, now Pat. No. 7,778,920.

(60) Provisional application No. 60/277,539, filed on Mar. 20, 2001, provisional application No. 60/311,541, filed on Aug. 10, 2001.

(51) Int. Cl.
*G06Q 40/00* (2006.01)

(52) U.S. Cl. .......................................... 705/38; 705/39
(58) Field of Classification Search ....................... None
See application file for complete search history.

(56) References Cited

U.S. PATENT DOCUMENTS

| | | | |
|---|---|---|---|
| 2,616,612 A | 11/1952 | Guttman | 229/92.8 |
| 5,459,306 A | 10/1995 | Stein et al. | 235/383 |
| 5,489,123 A | 2/1996 | Roshkoff | |
| 5,640,577 A | 6/1997 | Scharmer | |
| 5,644,723 A | 7/1997 | Deaton et al. | 705/14 |
| 5,745,681 A | 4/1998 | Levine et al. | |
| 5,794,259 A | 8/1998 | Kikinis | |
| 5,805,158 A | 9/1998 | Bertram et al. | |
| 5,870,721 A | 2/1999 | Norris | |
| 5,878,403 A | 3/1999 | DeFrancesco et al. | |
| 5,883,810 A | 3/1999 | Franklin et al. | |

(Continued)

OTHER PUBLICATIONS

USPTO; Office Action dated Oct. 27, 2006 in U.S. Appl. No. 10/082,171.

(Continued)

*Primary Examiner* — Jason M Borlinghaus
(74) *Attorney, Agent, or Firm* — Snell & Wilmer L.L.P.

(57) ABSTRACT

A system and method for providing in real-time an immediately accessible customized transaction account via the internet is disclosed. In particular, the system and method recognizes distinct access codes which are correlated to the credit profile of a person accessing an on-line application system via a computer network. During operation of the invention, a party may be driven to the on-line application system via the internet to conduct a transaction in response to an invitation to enroll in a special program. Upon entering the on-line application system, the accessing party may be unilaterally given the opportunity to apply for a special offer, which has been tailored to the accessing party's credit profile.

20 Claims, 3 Drawing Sheets

U.S. PATENT DOCUMENTS

| | | | |
|---|---|---|---|
| 5,897,622 A | 4/1999 | Blinn et al. | |
| 5,950,179 A | 9/1999 | Buchanan et al. | |
| 5,970,478 A | 10/1999 | Walker et al. | 705/35 |
| 5,991,381 A | 11/1999 | Bouanaka et al. | |
| 5,999,914 A | 12/1999 | Blinn et al. | |
| 6,000,832 A | 12/1999 | Franklin et al. | |
| 6,014,645 A | 1/2000 | Cunningham | |
| 6,018,718 A | 1/2000 | Walker et al. | |
| 6,029,149 A | 2/2000 | Dykstra et al. | |
| 6,032,136 A | 2/2000 | Brake, Jr. et al. | |
| 6,047,268 A | 4/2000 | Bartoli et al. | |
| 6,088,686 A | 7/2000 | Walker et al. | |
| 6,088,700 A | 7/2000 | Larsen et al. | 707/10 |
| 6,105,007 A | 8/2000 | Norris | |
| 6,105,009 A | 8/2000 | Cuervo | |
| 6,144,948 A | 11/2000 | Walker et al. | |
| 6,161,870 A | 12/2000 | Blank | |
| 6,175,823 B1 | 1/2001 | Van Dusen | |
| 6,199,079 B1 | 3/2001 | Gupta et al. | |
| 6,227,447 B1 | 5/2001 | Campisano | |
| 6,251,017 B1 | 6/2001 | Leason et al. | 463/42 |
| 6,324,524 B1 | 11/2001 | Lent et al. | 705/38 |
| 6,330,543 B1 | 12/2001 | Kepecs | 705/14 |
| 6,405,181 B2 | 6/2002 | Lent et al. | 705/38 |
| 6,422,462 B1 | 7/2002 | Cohen | 235/381 |
| 6,434,534 B1 | 8/2002 | Walker et al. | 705/14 |
| 6,694,300 B1 | 2/2004 | Walker et al. | 705/14 |
| 6,795,812 B1 | 9/2004 | Lent et al. | 705/38 |
| 6,898,570 B1 | 5/2005 | Tedesco et al. | 705/14 |
| 6,907,315 B1 | 6/2005 | Hartman et al. | 700/216 |
| 6,928,413 B1 | 8/2005 | Pulitzer | 705/14 |
| 6,970,853 B2 | 11/2005 | Schutzer | 705/67 |
| 6,978,369 B2 | 12/2005 | Wheeler et al. | 713/170 |
| 7,054,830 B1 | 5/2006 | Eggleston et al. | 705/14 |
| 7,076,442 B2 | 7/2006 | Lin et al. | 705/10 |
| 7,310,617 B1 | 12/2007 | Cunningham | 705/38 |
| 7,343,310 B1 | 3/2008 | Stender | 705/4 |
| 7,401,731 B1 | 7/2008 | Pletz et al. | 235/380 |
| 7,472,090 B1 | 12/2008 | White | 705/38 |
| 2001/0014868 A1 | 8/2001 | Herz et al. | 705/14 |
| 2002/0046089 A1* | 4/2002 | Zorn | 705/14 |
| 2002/0052776 A1 | 5/2002 | Rothman et al. | 705/10 |
| 2002/0062249 A1 | 5/2002 | Iannacci | 705/14 |
| 2002/0077964 A1 | 6/2002 | Brody et al. | 705/38 |
| 2002/0156723 A1 | 10/2002 | Lilly et al. | 705/38 |
| 2002/0188533 A1 | 12/2002 | Sanchez et al. | 705/30 |
| 2003/0097270 A1 | 5/2003 | Musselwhite et al. | 705/1 |
| 2003/0101115 A1 | 5/2003 | Reddy | 705/35 |
| 2004/0039679 A1 | 2/2004 | Norton et al. | 705/37 |
| 2004/0078328 A1 | 4/2004 | Talbert et al. | 705/40 |
| 2004/0117300 A1 | 6/2004 | Jones et al. | 705/39 |
| 2006/0136306 A1 | 6/2006 | Rothman et al. | 705/26 |
| 2008/0228611 A1 | 9/2008 | Lilly et al. | 705/34 |

OTHER PUBLICATIONS

USPTO; Final Office Action dated Jun. 14, 2007 in U.S. Appl. No. 10/082,171.
USPTO; Advisory Action dated Oct. 30, 2007 in Appl. No. 10/082,171.
USPTO; Office Action dated Jan. 25, 2008 in Appl. No. 10/082,171.
USPTO; Final Office Action dated Aug. 15, 2008 in U.S. Appl. No. 10/082,171.
USPTO; Advisory Action dated Nov. 25, 2008 in U.S. Appl. No. 10/082,171.
USPTO; Office Action dated Mar. 23, 2009 in U.S. Appl. No. 10/082,171.
USPTO; Office Action dated Oct. 27, 2009 in U.S. Appl. No. 10/082,171.
USPTO; Notice of Allowance dated Apr. 5, 2010 in U.S. Appl. No. 10/082,171.
Juliana Ratner, Capital One Consumer-Tailored Products, Bloomberg News, Jul. 14, 1998.
Bloom, "Sears Plans New Flavors," American Banker. New York: Sep. 25, 1998. vol. 163, Iss. 184; p. 8.
"e-Rewards™ Launches 'By Invitation Only' E-mail Rewards Program," PR Newswire. New York: Mar. 8, 2000. p. 1.
Harris, "Fight the cost of acquiring customers by making the most of older accounts," Card Marketing. New York: Jan./Feb. 2001. vol. 5, Iss. 1; p. 30.
Fickenscher, "Card Issuers Try Old Trick to Get New Business," American Banker. New York: Feb. 29, 2000. vol. 165, Iss. 40; p. 1.
Valentine, The secret world of selling cards on the web, ABA Banking Journal, Sep. 1999.
Fitzgerald, Getting more out of direct mail, Credit Card Management, Mar. 2000.

* cited by examiner

METHOD AND APPARATUS FOR PROVIDING PRE-EXISTING CUSTOMERS AND PROSPECTIVE CUSTOMERS WITH AN IMMEDIATELY ACCESSIBLE ACCOUNT

RELATED APPLICATIONS

This patent application claims priority to, and the benefit of, U.S. patent application U.S. Ser. No. 10/082,171, entitle "METHOD AND APPARATUS FOR PROVIDING PRE-EXISTING AND PROSPECTIVE CUSTOMERS WITH AN IMMEDIATELY ACCESSIBLE ACCOUNT" filed on Feb. 25, 2002. The '171 application claims priority to, and the benefit of, the U.S. provisional patent application U.S. Ser. No. 60/277,539, entitled "SYSTEM AND METHOD FOR RECOGNIZING PRE-EXISTING CUSTOMERS" filed on Mar. 20, 2001, and U.S. provisional patent application U.S. Ser. No. 60/311,541, entitled "SYSTEM AND METHOD FOR PRE-APPROVED INTERNET APPLICATIONS" filed on Aug. 10, 2001. All of which are hereby incorporated by reference.

FIELD OF INVENTION

The present invention generally relates to identifying and distinguishing between pre-existing card holders and prospective card holders accessing an on-line system maintained by a card provider, and providing the accessing party with personalized enrollment offers.

BACKGROUND OF THE INVENTION

In recent years, the convenience of using transaction cards in financial transactions has led to an increased number of transaction card holders worldwide. To increase revenues from the increased card usage, transaction card providers are typically seeking new methods to increase the number of users of their card provider systems. One method which is employed involves providing prospective users with "pre-approval." Pre-approved offers are typically designed to encourage the prospective user to become a customer (e.g., card holder, transaction account enrollee, etc.) of the transaction card provider. In a conventional pre-approval offer a prospective card holder is informed that the prospective card holder fits a pre-determined criteria, which allows the prospective card holder to apply for, and subsequently receive, a card, financial account or transactional account system by the card provider. In addition, the prospective card holder's pre-approval status provides the prospective card holder access to certain special offers related to the financial systems.

Traditional methods of informing prospective card holders of their pre-approval status involves using direct mailers or telephonic communications. Where direct mailers or telephonic communications are used, the pre-approved customer is often invited to complete an application for enrollment in the systems for which the person is pre-approved. For example, where the invitation is communicated to the prospective card holder via direct mail, the prospective card holder must typically/complete an application form provided in the direct mailer and return the application to the card provider for processing. Alternatively, the direct mailer may invite the prospective card holder to telephone the card holder and complete the application telephonically. Further still, where the pre-approval offer is communicated to the prospective card holder via a phone call initiated by the card provider, the card provider informs the prospective card holder of the pre-approval status. During the telephone communication, the prospective card holder is then invited to complete an application for enrollment in the provider's systems.

Another method which may be used by prospective card holders to apply for enrollment in a pre-approved program takes advantage of the growing popularity of the Internet. With the increased usage of the interne to conduct e-commerce, transaction card providers are often developing on-line application systems (e.g., web site based application site maintained on a card provider server). An on-line application system is a method provided by a financial institution, such as, a transaction card provider, which allows a prospective customer to apply for financial systems, transact commerce, or other such activities via a computer network. To increase usage of the on-line application system, a card provider may communicate the on-line application option via a direct mailer or telephonically as is currently done with the traditional application methods discussed above. In this way, the prospective customer is driven to the on-line application system to complete the pre-approved application.

One problem associated with the above methods is that the invitation to apply is often not made personal to the prospective customer (e.g. prospective card holder). That is, the invitation may involve a general pre-approval offer not tailored to a specific background (e.g., credit profile, purchase history, demographic data, etc.) of the prospective customer. In particular, the offer may be identical to an offer which is mailed to a multitude of prospective card holders, without taking into consideration any one individual prospective card holder's current financial, purchase or demographic profile (collectively called "customer profile" herein).

Another method which is used by financial institutions to increase the number of card users involves encouraging pre-existing transaction card holders (e.g. pre-existing transaction account enrollees) to enroll in other transaction cards or financial or transactional systems offered by the card provider. Similar to the prospective card holders, the pre-existing card holders are often contacted using the direct mailer or telephonic methods described above. That is, the pre-existing transaction card holder is typically either forwarded a direct mailer or receives a telephonic communication informing the pre-existing card holder that the pre-existing card holder has been pre-approved for enrollment in other systems offered by the card provider. The pre-existing card holder is then invited to apply for the other systems by filling out a pre-approval application and forwarding the application to the card provider for processing. Alternatively, where the pre-existing card holder is contacted by telephone, the pre-existing card holder is invited to telephonically enroll in the other systems.

In addition to the above, the pre-existing card holder may be driven to an on-line application system maintained by the financial institution. That is, the pre-existing card holder may be invited, via direct mailer or telephonically, to access a card provider on-line application via a computer network where the pre-existing card holder may complete a pre-approval application. As with the prospective card holder, however, conventional on-line application systems are limited in their ability to recognize the pre-existing card holder and subsequently offer the pre-existing card holder a special offer tailored to the pre-existing card holder's customer profile.

As such, a system is needed that recognizes and distinguishes between pre-approved prospective card holders and pre-approved pre-existing card holders for the purpose of extending offers specially tailored to the individual prospective card holder and pre-existing card holder's customer profile. Such a system would reduce or eliminate the cost associated with traditional direct mailer or telephonic communication methods, thereby increasing the card provider's revenues. A desired system would allow a more convenient method for enrolling new users in a card provider's (e.g. transaction account provider's) system, or to upgrade an existing system.

SUMMARY OF THE INVENTION

The present invention addresses many of the shortcomings of the prior art, particularly in the ability of an on-line application system to facilitate recognition of an accessing party and to offer individualized (e.g., customized) enrollment offers. It should be noted that although the present invention is described with respect to a transaction card, such as a transaction card, debit card, smart card, stored value card, or similar financial/banking card, the invention is not to be so limited. For example, the present invention is applicable to any such financial or transactional account arrangement wherein the financial system transactional account provider offers pre-existing enrollees and prospective enrollees individualized, customized, or personalized enrollment offers. Such a financial or transactional arrangement may require the provider to maintain a database, or collection of databases, wherein information regarding a prospective enrollee's customer profile is stored.

In accordance with one aspect of the present invention, a prospective card holder (e.g. prospective transactional account enrollee) or pre-existing card holder (e.g. pre-existing transactional account enrollee) may access an on-line application system maintained by a card provider (e.g. transaction account provider) server. The prospective card holder may then provide a pre-approval code to the card provider server. A transaction card provider server facilitates verification of the validity of the pre-approval code prior to allowing the prospective card holder to enroll in a pre-approved individually tailored (e.g., customized) system or program offered by the provider.

In the instance where the party accessing the on-line application system is a pre-existing card holder, the pre-existing card holder may provide the card provider server with information identifying the card holder as a pre-existing customer of the provider. Once the pre-existing card holder's information is verified, the pre-existing card holder is unilaterally invited to enroll in a special individually tailored system offered by the provider, for which the pre-existing card holder is pre-approved.

In one embodiment, pre-approved prospective card holder or the pre-existing card holder (collectively called "accessing party") accesses an on-line application system maintained on a card provider server. The accessing party uses a computer interface to provide the server with information identifying the accessing party as either a pre-approved prospective customer or a pre-approved pre-existing customer. The card provider server then verifies that the identifying information is valid. Such validation may include comparing the identifying information to a database containing a plurality of pre-approved files, where each file corresponds to the accessing party's identification information, or a portion thereof. Once it is determined that the accessing party is a valid pre-approved party, the accessing party is invited to enroll in a system provided by the provider. The invitation may include a special offer customized to fit the accessing party's customer profile.

In another embodiment, the card provider may maintain a separate solicitation database storing the identifying information of the accessing party and additionally storing special offers for which the person is pre-approved. Once the accessing party's identification is verified, the accessing party's identifying information is matched to a corresponding special offer stored on the solicitation database. The corresponding special offer and identifying information is then provided to the accessing party for verification and acceptance. If verified and accepted, an enrollment application containing the accessing party's identification information is processed in substantially real-time and the accessing party is provided transaction account (e.g., transaction card, line of credit account, etc.) information corresponding to an immediately accessible transaction account (e.g., real-time account). The substantially real-time account may then be made immediately available for use by the accessing party.

In yet another embodiment, the card provider may maintain a separate pre-existing card holder database, storing the customer profile of the pre-existing card holder. In addition, the pre-existing card holder database may also store the special offer for which the pre-existing card holder is pre-approved. Once the accessing party's identification is validated, the accessing party may be unilaterally provided with an offer for special enrollment and a portion of the accessing party's credit profile. The accessing party may then validate the information, after which, the accessing party is enrolled in the special system of the provider, in accordance with the corresponding special offer.

In yet another embodiment, the card provider may maintain a pre-approved database containing all offers corresponding to an individual accessing party. Once the accessing party accesses the on-line application system, the accessing party's identifying information may then be compared to the pre-approval data entries stored on the pre-approval database to ensure that the accessing party is pre-approved for a special offer provided by the card provider. Upon verifying that the accessing party is pre-approved for a special offer, the accessing party is then invited to enroll in a system provided by the card provider in accordance with the individual customer profile of the accessing party. If enrolled, the accessing party is provided with real-time transaction account information permitting the accessing party to immediately use the transaction account.

Further still, in another embodiment, the card provider may permit the accessing party to apply for special enrollment where the accessing party's identifying information may not be matched to the information stored on either the pre-existing customer database, solicitation database or the pre-approval database. In this case, the accessing party information is processed for providing the accessing party with a transaction account which may be used once the relevant transaction account information is forwarded to the accessing party. In this instance, the relevant transaction account information may be provided to the accessing party at a later date. Such relevant information may be provided to the accessing party via mail, or alternatively, may be provided to the accessing party in an electronic communication provided to the accessing party once the processing of the accessing party's identifying information is complete.

BRIEF DESCRIPTION OF THE DRAWINGS

The subject invention will hereinafter be described in the context of the appended drawing figures, wherein like numerals denote like elements, and.

DETAILED DESCRIPTION OF EXEMPLARY EMBODIMENTS

Figure 1A:
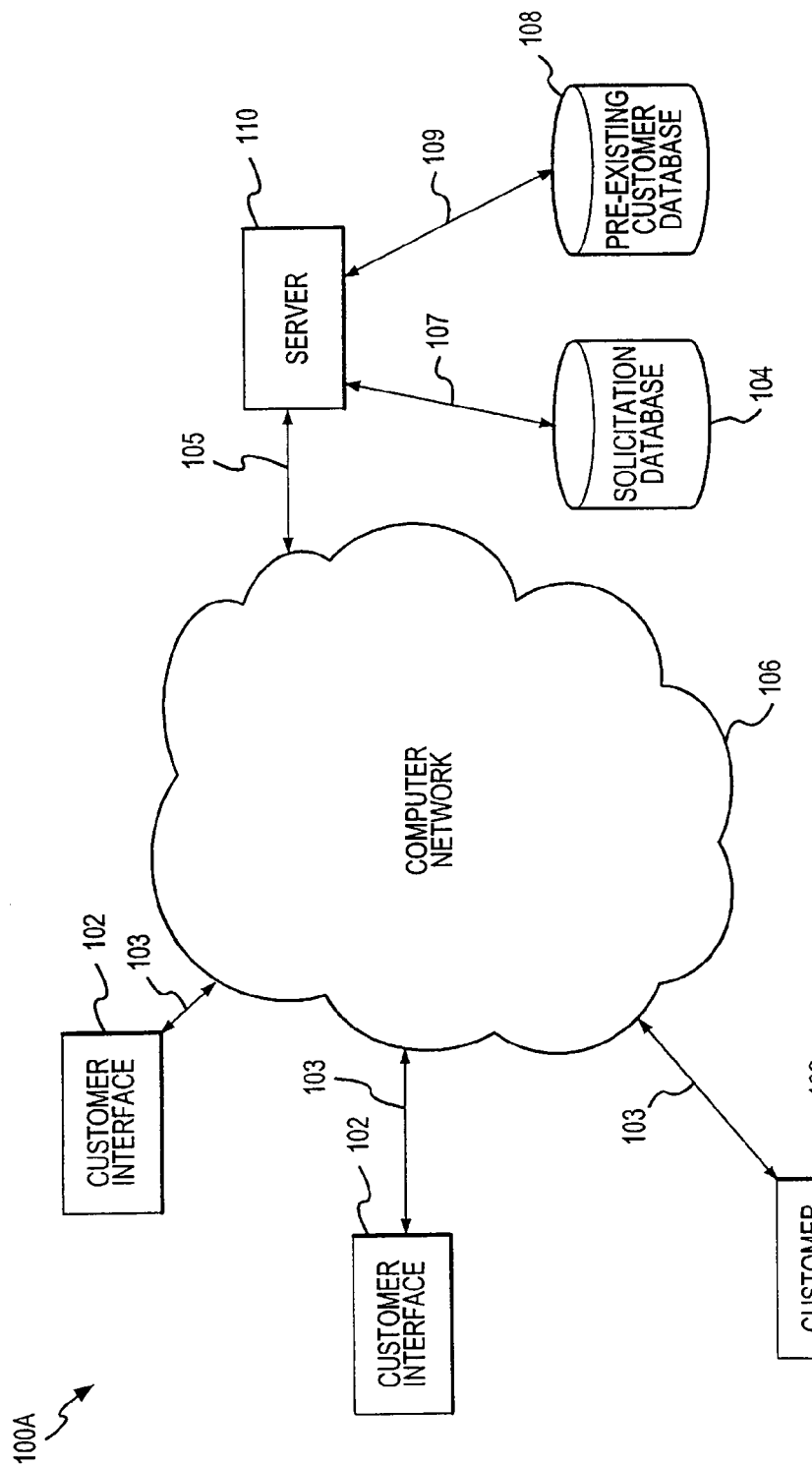
FIG. 1A is an exemplary schematic block diagram of a pre-approval card provider system in accordance with an exemplary embodiment of the present invention.

The present invention may be described herein in terms of functional block components and various processing steps. It should be appreciated that such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the present invention may incorporate security or fraud prevention components, such as, encryption, decryption and the like. For a basic introduction of suitable encryption or cryptography techniques, please review a text written by Bruce Schneier which is entitled "Applied Cryptography: Protocols, Algorithms, And Source Code In C," published by John Wiley & Sons (second edition, 1996), which is hereby incorporated by reference.

In addition, it should be appreciated that the particular implementations shown and described herein are illustrative of the invention and its best mode and are not intended to otherwise limit the scope of the present invention in any way. Indeed, for the sake of brevity, conventional data networking, application development, encryption, cryptographs and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiments, the invention is described as pertaining to a system facilitating communication between an accessing party and card provider using a computer network such as the Internet. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. The users may interact with the system via any input device (e.g. card holder interface) such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, etc., running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Further, the present invention might employ any number of conventional techniques for data transmission, signaling, data processing, network control, and the like. For example, radio frequency (RF) or other wireless techniques could be used in place of any network technique described herein.

Further still, the terms "Internet," "computer network" or "network" may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

While the terms "transaction card", "credit card accounts," "transaction account," "card holder account" or "credit card" may be used in the exemplary embodiments, the invention contemplates the use of any type of financial or transaction account, whether or not associated with a physical card, such as, for example, debit card, charge card, smart card, bar coded card, magnetic stripe card, stored value card, merit based card, temporary use account number, brokerage account, 401K plan, stock account, telephone account, utility account, loyalty point account, and/or the like. One such transaction account which is suitable for use with this invention is the described by Bishop et al., in the U.S. patent application Ser. No. 09/652,899 entitled "Methods and Apparatus for Conducting Electronic Transactions" filed Aug. 31, 2000 (herein incorporated in its entirety by reference).

An "account number", as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

As also used herein, the term "card holder", "end user", "consumer", "customer", "cardmember", "business" or "merchant" may be used interchangeably with each other, and each shall mean any person, entity, machine, hardware, software or business. Although labeled as a "bank," the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer has a computing unit in the form of a personal computer, although other types of computing units may be used including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a mini-computer, a PC server, a network set of computers, and the like.

Further still, it will be appreciated that many applications of the present invention could be formulated. For example, the system could be used to gain real-time transaction account approval when the accessing party requests enrollment in a card provider system using any convention credit, debit, merit or other similar account providing the account holder purchasing or redeeming capabilities.

Furthermore, the prospective card holder, the pre-existing card holder and the card provider, described herein, may represent individual people, entities, business, software, hardware or any other credit account or financial account provider or transaction account provider such as, for example, various types of card issuing institutions, such as banks, credit card companies, card sponsoring companies, or third party issuers under contract with financial institutions. The payment network (e.g., transaction processing network or system) may include existing proprietary networks that presently accommodate transactions for credit cards, debit cards, and other types of financial/banking cards, such as, for example, the American Express®, and VisaNet® network.

In an exemplary embodiment, the present invention facilitates differentiation of the acquisition experience for pre-approved prospective card holders and pre-approved existing card holders, from that of other external prospects accessing the on-line application system. FIG. 1A illustrates an exemplary system 100A in accordance with an exemplary embodiment of the present invention. System 100A includes an online infrastructure that may be used to recognize pre-approved prospective card holders and pre-approved pre-existing card holders having a pre-approval status and/or program enrollment eligibility status with the card provider.

With reference to FIG. 1A, exemplary card provider system 100A may include a number of customer interface systems 102 which are configured to communicate with a card provider server 110 (e.g., card provider transaction processing system) via a network 106 to send and/or receive information (e.g., card holder identity, charge account number, expiration date, purchase history, pre-approval code, etc.) related to a transaction request (e.g. log on request, request for access, purchase request, request for pre-approval application, etc.).

In an exemplary embodiment, the transaction request may include a pre-approval code and/or card holder identifying information or the like. The card provider server (e.g. transaction account server) 110 may be configured to receive the transaction request from the customer interface 102 and seek validation of the information provided. The card provider server 110 may validate the information by matching the information to data files stored on either the solicitation database 104 or pre-existing customer database 108. Once the information is verified, a special enrollment offer may be provided to the customer interface 102. In a particular embodiment the special enrollment offer may be customized to a particular pre-approved prospective card holder or a pre-approved pre-existing customer, in accordance with the accessing party's customer profile. For example, the special offer may include reduced annual percentage rates (APR) or reduced outstanding balance interest rates for accessing parties with an exceptional credit or lending history, or alternatively, may include higher APR or outstanding balance interest rates for accessing parties with a less than exception credit or lending history. The interest rates may be dynamic in that the interest rate may rise or fall according to changes in an accessing parties customer profile, or, for example, changes in the external interest rate governing forces as determined by the card provider.

As used herein, the customer profile may include the accessing parties name, address, time at current address, current income, credit rating, debt to credit ratio or any similar factors used to calculate a credit rating, as well as, purchase or transaction history and customer demographic categorizations. Such factors are commonly known among financial and card granting institutions, and as such, will not be discussed in detail herein. Thus, all other methods and criteria for determining an accessing parties credit worthiness (e.g., ability to timely repay credit) as are known are considered to be within the scope of this invention. More particularly, where formulas for calculating credit worthiness are required, such calculations may be performed by card provider server 110, or any similar device capable of performing arithmetic calculations. It is understood, that while not explicitly discussed, such devices are common to card provider systems and are therefore considered within the scope of the present invention.

Card provider server 110 may be any conventional server (e.g. transaction account server) known in the art, including means for receiving card holder transaction requests (e.g., enrollment or purchases request, etc.) via the internet 106, processing such transaction requests and sending confirmation or denial of the transaction requests to customer interface 102. Customer interface 102 may be suitably coupled to the card provider 110 via network 106 and data lines 103 and 105. Card provider server 110 may be suitably coupled to the network 106 via data link 105, and to solicitation database 104 and pre-existing database 108 via data links 107 and 109, respectively.

As used herein, database may include any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

A variety of conventional communications media and protocols may be used for data links 103, 105, 107, and 109. Such links might include, for example, a connection to an Internet System Provider (ISP) over the local loop as is typically used in connection with standard modem communication, cable modem, Dish networks, ISDN, Digital Subscriber Line (DSL), or various wireless communication methods. In addition, customer interface system 102, card provider system 110, solicitation database 104 and pre-existing card holder database 108 might each independently and separately, or collectively, reside within a local area network (LAN) which interfaces to network 106 via a leased line (T1, D3, etc.). Such communication methods are well known in the art, and are covered in a variety of standard texts. See, e.g., Gilbert Held, Understanding Data Communications (1996), hereby incorporated by reference.

Customer interface 102 may include any convenient combination of hardware and software components configured to allow a customer (or prospective customer) to communicate over network 106. For example, customer interface 102 might include a standard personal computer (PC) comprising a CPU, monitor, storage, keyboard, mouse, and communication hardware appropriate for the given data link 103 (e.g., V.90 modem, network card, cable modem, etc.). In alternate embodiments, customer interface system 102 may be a personal data assistant (PDA) capable of manipulating images and communicating with merchant server 110. Customer interface system 102 typically may typically include an operating system (e.g., Windows 95/98/2000, Linux, Solaris, MacOS, and/or the like) as well as various conventional support software modules and drivers typically associated with computers. Customer interface system 102 may also include application software configured to communicate over network 106 with card provider server 110, for example, a world wide web (WWW) browser or any other communication software. In an exemplary embodiment, customer interface system 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Card provider server 110 may comprise any number of hardware, software, and networking components suitable to provide an user interface to a network 106, solicitation database 104 or pre-existing customer database 108, as described in further detail below. In one embodiment, card provider server 110 may include Sun Ultra SPARC Enterprise 250 and 450 servers which may be used in conjunction with a Sun Solaris 7 or Linux operating system, Apache web server software, and an Oracle 8 or MySQL database system. Of course, particular hardware and software components used in card provider server 110 will vary widely from embodiment to embodiment. Furthermore, card provider server 110 may represent a "cluster" or group of separate computer systems providing the functionalities described herein.

In a typical card provider environment, solicitation database 104 and pre-existing customer database 108 may include a plurality of distinct locations for maintaining individual pre-existing card holder or pre-approved prospective card holder information, such as card holder identity, account number, account balance, amount available, purchase history, etc. For example, in one embodiment, a distinct location may include the customer profile of a single pre-approved prospective card holder or a pre-existing card holder. In another embodiment, the distinct locations may additionally include customized pre-approval offers corresponding the individual prospective card holder or pre-existing card holder's identity. That is, the distinct locations may store not only the customer profile for a particular party, but also the distinct pre-approval offer corresponding to that party's customer profile. The database 104 and 108 may be a graphical, hierarchical, relational, object-oriented or other database, and may be maintained on a local drive of server 110 or on a separate computer coupled to server 110 via a local area or other network (not shown). In one embodiment, the database may be a collection of ASCII or other text files stored on a local drive of server 110. Pre-approved prospective card holder and pre-existing card holder account information may be suitably retrieved from the database and provided to customer interface 102, upon request via a server application, as described more fully below.

As noted, within each pre-existing customer database there may be stored a plurality of individual data locations corresponding to the customer profile and/or enrollment offer for each pre-approved pre-existing customer. In one embodiment, pre-existing customer database 108 is managed by the server 110 which is maintained by a credit card provider with which the pre-existing card holder has established a billing account. The billing account may be associated with any suitable credit card system such as Visa®, MasterCard®, American Express®, Discover®, or the like. Further, the billing account may additionally allow the card provider to recover payment for charges made by an individual customer who is a subscriber of the credit card system.

Similarly, solicitation database 104 may also be managed by the server 110. The distinct individual data locations stored on the solicitation database 104 may include any information relevant to the identity and/or customer profile of any pre-approved prospective card holders. In some instances, a card provider may only have rudimentary information (e.g., name address, occupation, etc.) concerning the pre-approved prospective card holder. In that case, upon a suitable request to the solicitation database 104 by the card provider server 110, an incomplete credit profile may be provided to the customer interface 102 via network 106. At customer interface 102, the accessing party may be asked to provide missing credit profile information.

It should be noted that the information stored in the individual data locations may be provided to the customer interface 102 in any format which allows the accessing party to input the information into the customer interface 102 for receipt and real-time processing by the card provider server 110. In a typical example, the customer profile may be provided as a part of the provider's on-line application system process. For example, the information may be provided as a part of an on-line application system by populating on the customer interface 102 a pre-filled or partially pre-filled browser compatible web page (e.g., pre-filled or partially pre-filled application). In this way, the web page application provided to the customer interface 102 may be made personal to the accessing party. That is, the web page application may contain only the accessing party's individual information (e.g., customer profile) and any information pertaining to enrollment offers customized for that accessing party.

As used herein a pre-filled web page application contains various entry fields or data fields wherein each entry field corresponds to a portion of the data contained in the pre-approved prospective card holder or pre-approved pre-existing card holder customer profile. For example, where the web page displays the accessing party's name, address, yearly income, or the like, each of the name, address, and yearly income may occupy only one entry field. Further, each entry field may be configured such that the accessing party may update the accessing party's identifying information using the customer interface 102. That is, prior to submitting the information to the card provider server 110 for processing, where one or more of the entry fields contains incorrect data, the accessing party may be permitted to update that entry field accordingly. In this way, the accessing party may be permitted to validate that the accessing party's customer profile stored on the solicitation database 104 or the pre-existing card holder database 108 is correct.

Similarly, where the information displayed on the customized web page is incomplete, the web page may be only partially pre-filled and the accessing party may be permitted to provide the missing information prior to submitting the information to the card provider server 110 for processing. That is, the information contained on the databases 104 and 108 may be missing one or more important pieces of data required for calculating an accessing party's special offer interest rate, repayment interest rate, APR or the like. For example, the information may not include the accessing party's annual income, or additional debt liability or assets not known to the card provider. In this instance, the accessing party may be permitted to provide the information in similar manner as was described above with respect to the accessing party's ability to change errant information. Such providing of missing information may take place prior to the accessing party providing the on-line application to the card provider server 110 for processing.

By providing the accessing party with pre-filled and partially pre-filled personalized web pages, the card provider is capable of reducing the number of application fields the accessing party needs to complete, as compared to conventional on-line application methods. This, in turn, reduces the amount of application processing time and expenditure associated with traditional direct mail and telephonic methods. In addition, the pre-filled or partially pre-filled pages provide a more convenient method for the applications to be submitted and processed.

Figure 1B:
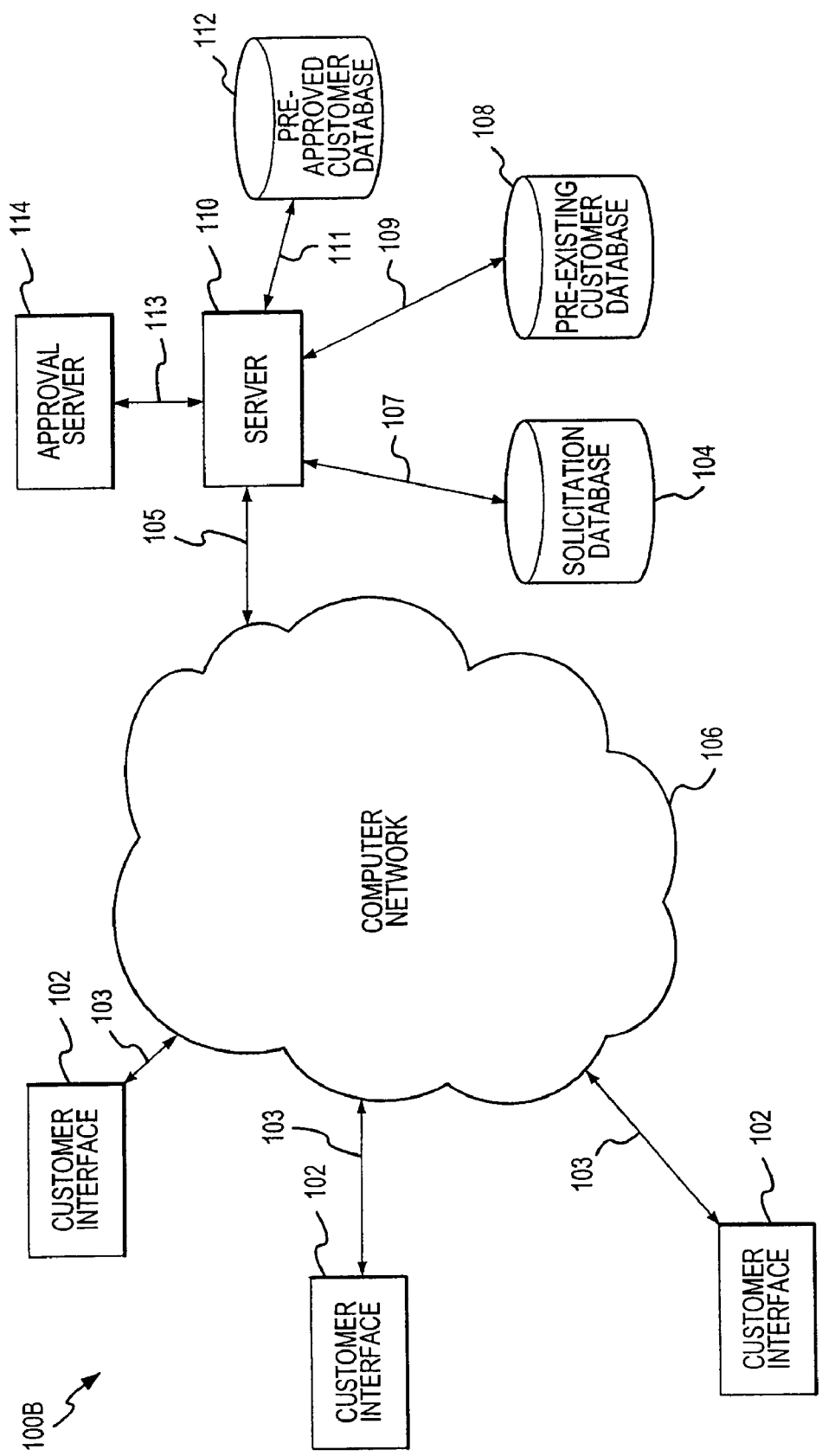
FIG. 1B is another exemplary schematic block diagram of a pre-approval card provider system in accordance with another exemplary embodiment of the present invention.

FIG. 1B depicts another exemplary embodiment of a card provider system 100B in accordance with the present invention, wherein like elements as to FIG. 1A have like descriptions. Included in FIG. 1B, however, may be separate pre-approved customer database 112 and a financial account approval server 114, which are connected to card provider server 110 via data links 111 and 113, respectively. Data links 111 and 113 are of a similar description to similar elements of FIG. 1A. Further, financial account approval server 114 may be of similar description as that of card provider server 110. Further still, the architecture of pre-approved customer database 112 is of similar description as that of pre-existing customer database 108 and solicitation database 104, in that the pre-approved customer database may include distinct data locations for storing information pertaining to each distinct pre-approved prospective card holder and/or each pre-approved pre-existing card holder. That is, in this embodiment the information (e.g., credit profile) correlating to each pre-approved accessing party may be stored in the pre-approved customer database 112 in distinct data files. In this case, where the accessing party initiates the pre-approval process by providing to the card provider server 110 identifying information the card provider server 110 may seek to validate the provided identifying information by matching the identifying information to a distinct file stored on the pre-approved customer database 112.

As noted, financial account approval server 114 may be of similar description and operation as that of card provider server 110. In this particular embodiment, however, financial server 114 may be used to process the accessing party's customer profile information after the information is verified by the accessing party at customer interface 102. That is, the information may be verified by the accessing party at customer interface 102, after which the information may be forwarded to the financial account approval server 114 directly or via the card provider server 110. In such case, the financial account approval server 114, may process the information in similar manner as was described above with respect to the card provider server 110.

It should be understood that in some instances, a card provider may desire to provide the customer interface 102 with other messages or web pages apart from the individual web page corresponding to a particular accessing party. Such other web pages may be promotional web pages, status web pages or the like. Consequently, one skilled in the art will understand that such web pages may be provided to the customer interface 102 by card provider server 110 from the card provider server 110 location, or any such suitable device for providing canned (e.g., pre-prepared) web pages to a customer interface 102. Although not illustrated with respect to FIGS. 1A and 1B, such devices are commonly known, and as such, will not be discussed herein in their entireties.

Figure 2:
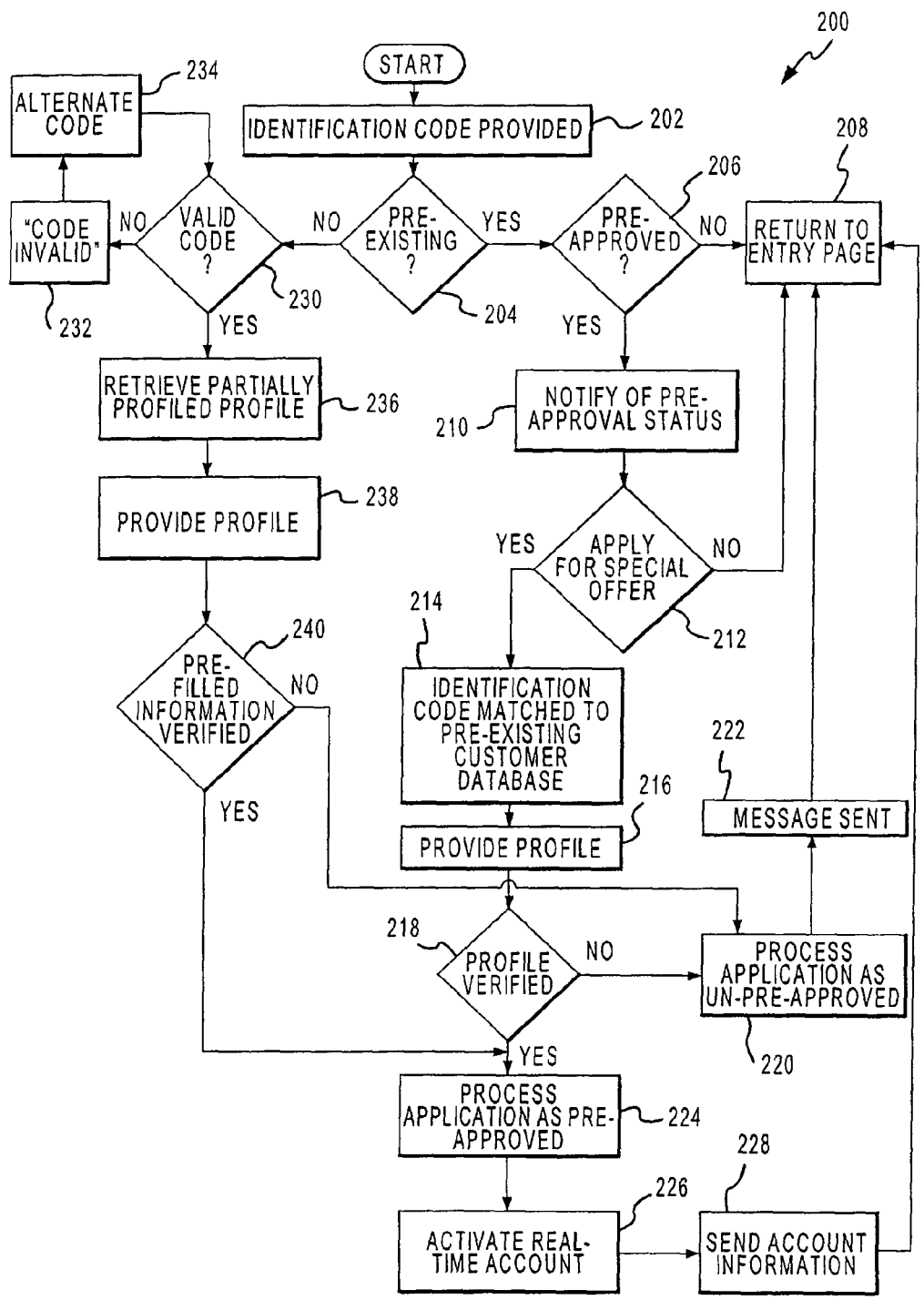
FIG. 2 is a flowchart illustrating a system and method for providing instant transaction account pre-approval in accordance with an exemplary embodiment of the present invention.

The operation of the present invention may be more fully understood with reference to FIG. 2 and continued reference to FIGS. 1A and 1B. FIG. 2 depicts a flow chart of an exemplary card provider system 200 in accordance with the present invention. As shown, the operation of system 200 begins with step 202 where an accessing party provides an identifying code (e.g., access code) to card provider server 110 via network 106 and customer interface 102. The access code, or accessing signal, may include information which may be used to facilitate identification of the accessing party. For example, where the accessing party is a pre-existing card holder, the accessing code may be the card holders name, credit card number or any such code provided to the accessing party by the card provider for the purpose of identifying the accessing party or accessing party transaction account. Where the accessing party is a prospective customer, the access code may be a password or code individualized to that particular accessing party. That is, in a typical example, the code may consist of a combination of ASCII characters, the persons first or last name, or a combination thereof. In any event, the access code may be one which is used by the card provider to facilitate determining the accessing party's identity or data associated with the accessing party.

Upon receiving the access code, the server 110 may then verify whether the access code belongs to an accessing party who is an established (e.g. pre-existing) card holder of the card provider systems (step 204). For example, the server 110 may seek to facilitate matching the accessing code to a distinct data profile stored on pre-existing customer database 108 (step 204). In a typical matching method, the access code is compared to the distinct data files stored in pre-existing customer database to determine if the accessing party's identification information may be found in the database 108. Where the accessing code does not correspond to a distinct profile in database 108, the accessing party may not be provided access to a secured area of the card provider system 100 to continue the accessing party's intended transaction.

Where the card provider server 110 is able to help locate a matching profile, the server 110 may then seek to determine if the pre-existing card holder is eligible for receipt of any pre-approved offers (step 206). In one embodiment, the pre-approved offer may be stored on the pre-existing customer database 108 correlative to the distinct data profile corresponding to the access code provided by the accessing party, as is described with respect to FIG. 1A. In which case, the server 110 may provide the accessing party notification of the accessing party's pre-approval status (step 210). Once the accessing party is informed of his pre-approval status, the accessing party is given an opportunity to apply for the enrollment in the special offer including a customized special offer corresponding to the accessing party's pre-approval status (step 212). The invitation may be provided to the accessing party at the customer interface 102 in the form of a customized on-line application system web page or promotional page populated on the interface 102. If the accessing party does not elect to apply for the customized special offer (step 212), the server 110 may then provide the accessing party access to a secured area of the card provider system 100A, 100B, where the secured area is reserved for card holders only. Contractually, the accessing party, who refuses to offer, may be returned to the entry page of the card provider web site (step 208).

If the accessing party elects to apply for the customized special offer (step 212) the customer profile information corresponding to (e.g. matching) the accessing party's access code is provided to the accessing party by facilitating the population of a pre-filled application on customer interface 102. In one embodiment, where the corresponding profile is located by the server (step 214), it may be accompanied by at least one special offer (e.g., customized offer) for which the accessing party qualifies. In this case, the special offer is provided to the accessing party along with a personalized web page containing the accessing party's customer profile (or a portion thereof) in a format allowing the accessing party to verify or change the profile (step 216).

In some cases, in step 214 it may be require that the accessing party access code be first checked against the distinct files stored on a pre-approval database 112, containing a plurality of distinct pre-approval codes corresponding to distinct access codes. In this case, the server 110 may facilitate comparison of the access code to the files stored on the pre-approval database to ensure that the accessing party is eligible for receipt of a pre-approval offer (step 214). This verification process may involve the server 110 finding a matching access code on the pre-approval database 112. Where a match is found, it may be determined that the accessing party is eligible for receipt of a customized offer. That is, the server 110 has matched the access code to a corresponding pre-existing customer (e.g. card holder) profile on the pre-existing customer database 108. In this case, the customer profile it may be accompanied by at least one special offer (e.g., customized offer) for which the accessing party qualifies. The special offer is then provided to the accessing party along with a personalized web page containing the accessing party's customer profile (or a portion thereof). Here, the special offer may be provided in a format allowing the accessing party to verify or change the information stored in the customer profile (step 216).

As noted above, the information stored on the pre-existing customer database may be incorrect, outdated or incomplete. Consequently, when the accessing party is provided the profile, the accessing party may be given the opportunity to correct the errant information or verify that the information contained on the customized web page is correct. If the identifying information is incorrect, outdated or incomplete, the accessing party may then be permitted to update the information and provide the information to the card provider server 110. Once the accessing party makes changes to the information displayed on the web page, the information is deemed unverified or uncorroborated (step 218), and the accessing party's information, including the updated information, may be processed as an un-pre-approved application (step 220). That is, the accessing party is deemed to not be eligible for pre-approval status permitting receipt of real-time account information and the application is processed under normal processing procedures (e.g. businesses usual standard) as established by the card provider (step 220). Where the application is processed under normal processing procedures, the accessing party is notified that the accessing party is conditionally approved, delayed approved, not approved or the like (step 222) and the accessing party may then be provided access to a secured area of the card provider's web site to complete his intended transaction (step 208). Alternatively, where the accessing party's information is deemed un-pre-approved, the accessing party's information may be processed such that a transaction account may be established for the accessing party, but the transaction account information may not be provided to the accessing party in real-time. Instead, the transaction account information may be provided to the accessing party at a later date via conventional notification methods (e.g. electronic mail transactions, a postal mailing, etc.). In this way, a decision regarding the accessing party's approval status may be made substantially instantaneously.

If the accessing party facilitates verification that the accessing party's corresponding information as it is stored on the pre-existing customer database is correct, then the accessing party's application for enrollment in the customized program is processed as a pre-approved application for real-time approval (step 224). Such processing may be performed by the card provider server 110, or by a financial account approval server 114 remote from the card provider server. The processing steps for processing the pre-approved application may take any form as determined by the card provider. At the completion of the processing steps, a new transaction account corresponding to the special enrollment offer may be activated (step 226) and a message including the accessible account information (e.g., transaction account number, credit line, annual percentage rate, interest on outstanding balance, etc.) may be forwarded to the accessing party via the card provider server 110 (step 228). In an exemplary embodiment, the account information is accessible in substantially real-time. In this way, the accessing party is provided an accessible transaction account in substantially real-time, which may be used, immediately in an exemplary embodiment, for performing financial transactions. The accessing party may then be provided access to a secured area of the card provider system 100A, 100B, for conducting his intended transaction or to the web site entry page (step 208).

In the instance where the server 110 facilitates determination that the access code provided by the accessing party does not sufficiently correspond to an account of a pre-existing card holder (step 204), the access code may be validated (step 230). In this case, the access code may include information identifying the accessing party as a prospective pre-approved customer. As noted, such an access code may be parsed into parts identifying the customer's identity, and the accessing parties pre-approval status. For instance, an exemplary access code may include a pre-approval code and up to the first seven letters of the accessing parties last name. The server 110 may then take the received access code and validate the code by comparing the code to the distinct pre-approval codes stored in distinct locations on a pre-approved customer profile database 112. If the access code is not matched to a data location on the profile database 112, the access code is deemed invalid (step 232) and a message informing the accessing party of the invalid status is forwarded to the accessing party (step 234). The accessing party may then be permitted to re-enter the access code or provide a different access code for verification (step 234). If the accessing party provides an alternate access code, the access code may then enter the validation step for determining the validity of the code (step 230). Alternatively, if the accessing party does not enter an alternate access code or reenters the first provided access code, the instant pre-approval process described in FIG. 2, may be terminated. Such termination of process may take place after the card provider server receives one invalid access code entry or a pre-determined number of access code entries, as determined by the card provider.

If the access code is matched to a data location on the pre-approved customer database 112, the access code is deemed valid (step 230). In which case, the access code may be matched against the distinct data files stored in the solicitation database 104 (step 236). In one embodiment, the data files may include only the customer profile information. In another embodiment, the data profile may include the customer profile and any pre-approval offers for which the accessing party qualifies. The data profile corresponding to the access code may then be retrieved (step 236) and provided to the accessing party in a manner permitting the accessing party to verify the information contained in the data profile (step 238). That is, the profile may be provided in the form of a pre-filled, or partially pre-filled customized web page as described above. The provided web page may permit the accessing party to verify the corresponding information stored in the solicitation database 104, or to update the information as necessary (step 240). Where the accessing party elects to submit the web page (e.g. on-line application) unchanged, the information is deemed verified (step 240) and the application is process as a pre-approved application (step 224) in similar manner as with respect to the pre-existing card holders described above. That is, a real-time transaction account may be established for the accessing party (step 226) and information regarding the real-time transaction account provided to the accessing party via the card provider server 110 and the customer interface 102 (step 228). The accessing party may then be provided substantially real-time access to a secured location of the card provider system 100A, 100B. Alternatively, the accessing party may be returned to the web site entry page (step 208).

It should be understood that the present invention is suitable for any system utilizing an on-line application process. For example, the system may be used with on-line systems employing any credit, banking or loyalty program, and any program concerning on line activation. Such exemplary systems are disclosed in U.S. Provisional Ser. No. 60/197,296 filed Apr. 14, 2000, U.S. Provisional 602/200,492, filed Apr. 28, 2000, U.S. Provisional No. 60/201,114 filed May 2, 2000, and U.S. Provisional No. 60/272,487 filed Feb. 27, 2001, all of which are hereby incorporated by reference.

It should be further understood that exemplary embodiments and system functions of the present invention include facilitating consultative card selling capabilities on-line, including: recognizing existing card products held by the accessing party, providing card pre-approval status via on-line communication, providing enrollment in rewards programs, matching access codes against a pre-approved eligibility file, removing or populating as many entry fields on an application as is desired, and accessing real-time pre-existing card holder or prospective card holder information from multiple mainframe systems.

In addition, the present system may be designed to support two types of activity, namely when a pre-existing card holder accesses a card provider on-line application system unsolicited, and when a pre-approved prospective card holder accesses the on-line application system due to notification of the accessing party's pre-approval status. In the instance where the accessing party is a pre-existing card holder, the card holder may log onto the on-line application system via a Single Sign On (SSO) application after having first registered at least one of the accessing party's existing card products with the card provider. In this case, the system may readily match the accessing party to the correlative identifying information, which allows the system to instantly recognize the accessing party as a pre-existing card holder, and to recognize the systems for which the accessing party is already enrolled.

If the accessing party is eligible for more than one special (e.g. customized) offer, then the system may incorporate on the card provider server 110, business logic which determines which special offer, or offers, to provide to the accessing party. If the accessing party elects to apply for a special offer, the customer profile information displayed to the accessing party may not include certain sensitive information (e.g., social security number, address, etc.) due to fraud concerns. The sensitive information, however, may be blindly passed by the system to a process server for processing the pre-approval application.

In the foregoing specification, the invention has been described with reference to specific embodiments. However, it will be appreciated that various modifications and changes can be made without departing from the scope of the present invention as set forth in the claims below. For example, various processing steps may be combined or eliminated as required. Further, various system elements described herein may be eliminated, and various steps may be performed by one or more of the elements described herein. In addition, other suitable elements may be substituted for the elements described herein, or inserted between the connecting lines of the embodiments set forth, without departing from the scope of this invention. Further still, the specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

In addition, the benefits, other advantages, and solutions to problems described have been illustrated above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method for facilitating a transaction account approval, the method comprising:

receiving, by a computer based system for facilitating the transaction account approval, a respective access code from a customer of a plurality of prospective customers and an existing customer of an account issuer at an interface of the account issuer, wherein a plurality of access codes were provided to the plurality of prospective customers and existing customers of the account issuer, and wherein each of the plurality of access codes can not be used to transfer funds via the account issuer;

determining, by the computer based system, whether the customer is a prospective customer or an existing customer based at least in part on the respective access code;

providing, by the computer based system, an offer from a plurality of stored offers to the customer based at least in part on the determining, wherein said offer for the prospective customer and existing customer is based at least in part on the respective access code; and performing, by the computer based system, at least one of a removal of fields and a population of fields at the interface of the account issuer based at least in part on a profile associated with the respective access code, wherein an amount of personal information requested from the customer when the customer is an existing customer is less than an amount of personal information requested from a prospective customer.

2. The method of claim 1, wherein the customer is an existing customer and wherein the providing further comprises matching the respective access code to the profile in an existing customer database.

3. The method of claim 2, wherein the offer is associated with the profile.

4. The method of claim 2, further comprising providing the offer in an application for a transaction account.

5. The method of claim 4, further comprising providing at least a portion of the profile in a form of a plurality of modifiable entry fields.

6. The method of claim 5, further comprising the step of validating the profile.

7. The method of claim 6, further comprising approving the application for the transaction account, wherein the approving is performed in real-time and wherein the transaction account is associated with transaction account information.

8. The method of claim 7, further comprising providing the transaction account information.

9. The method of claim 5, wherein at least one of the plurality of the modifiable entry fields is modified.

10. The method of claim 2, wherein the providing further comprises matching the respective access code to a pre-approval code.

11. The method of claim 10, further comprising providing the offer in an application for a transaction account.

12. The method of claim 11, further comprising providing at least a portion of the profile in a form of a plurality of modifiable entry fields.

13. The method of claim 12, further comprising validating the profile.

14. The method of claim 13, further comprising approving the application for the transaction account, wherein the approving is performed in real-time and wherein the transaction account is associated with transaction account information.

15. The method of claim 14, further comprising providing the transaction account information.

16. The method of claim 12, wherein at least one of the plurality of the modifiable entry fields is modified.

17. The method of claim 1, wherein the customer is a prospective customer and the method further comprises providing at least a portion of the profile in an application for a transaction account, and wherein the at least a portion of the profile is provided in a form of a plurality of modifiable entry fields.

18. The method of claim 17, further comprising validating the profile.

19. An article of manufacture including a non-transitory, tangible computer readable medium having instructions stored thereon for facilitating the transaction account approval that, in response to execution by a computing device, cause the computing device to perform operations comprising:

receiving a respective access code from a customer of a plurality of prospective customers and an existing customer of an account issuer at an interface of the account issuer, wherein a plurality of access codes were provided to the plurality of prospective customers and existing customers of the account issuer, and wherein each of the plurality of access codes can not be used to transfer funds via the account issuer;

determining whether the customer is a prospective customer or an existing customer based at least in part on the respective access code;

providing an offer from a plurality of stored offers to the customer based at least in part on the determining, wherein said offer for the prospective customer and existing customer is based at least in part on the respective access code; and performing at least one of a removal of fields and a population of fields at the interface of the account issuer based at least in part on a profile associated with the respective access code, wherein an amount of personal information requested from the customer when the customer is an existing customer is less than an amount of personal information requested from a prospective customer.

20. A system comprising: a tangible, non-transitory memory communicating with a processor, the tangible, non-transitory memory having instructions stored thereon for facilitating the transaction account approval that, in response to execution by the processor, cause the processor to perform operations comprising:

receiving a respective access code from a customer of a plurality of prospective customers and an existing customer of an account issuer at an interface of the account issuer, wherein a plurality of access codes were provided to the plurality of prospective customers and existing customers of the account issuer, and wherein each of the plurality of access codes can not be used to transfer funds via the account issuer;

determining whether the customer is a prospective customer or an existing customer based at least in part on the respective access code;

providing an offer from a plurality of stored offers to the customer based at least in part on the determining, wherein said offer for the prospective customer and existing customer is based at least in part on the respective access code; and performing at least one of a removal of fields and a population of fields at the interface of the account issuer based at least in part on a profile associated with the respective access code, wherein an amount of personal information requested from the customer when the customer is an existing customer is less than an amount of personal information requested from a prospective customer.

* * * * *